(12) United States Patent
Lilley et al.

(10) Patent No.: US 11,120,621 B2
(45) Date of Patent: Sep. 14, 2021

(54) SYSTEMS AND METHODS FOR APPLYING PARTIAL UPDATES TO POINT CLOUD TERRAIN

(71) Applicant: Cesium GS, Inc., Philadelphia, PA (US)

(72) Inventors: Sean Lilley, Exton, PA (US); Kangning Li, North Wales, PA (US)

(73) Assignee: CESIUM GS, INC, Philadelphia, PA (US)

( * ) Notice: Subject to any disclaimer, the term of this patent is extended or adjusted under 35 U.S.C. 154(b) by 0 days.

(21) Appl. No.: 17/100,522

(22) Filed: Nov. 20, 2020

(65) Prior Publication Data

US 2021/0158611 A1    May 27, 2021

Related U.S. Application Data

(60) Provisional application No. 62/938,700, filed on Nov. 21, 2019.

(51) Int. Cl.
*G06T 17/05*        (2011.01)

(52) U.S. Cl.
CPC .................................. *G06T 17/05* (2013.01)

(58) Field of Classification Search
CPC ........ G06T 17/05; G06T 15/08; G06T 3/4053
See application file for complete search history.

(56) References Cited

U.S. PATENT DOCUMENTS

| 7,417,717 | B2 * | 8/2008 | Pack ....................... G01S 17/08 356/4.01 |
| 9,389,084 | B1 * | 7/2016 | Chen ...................... G01C 21/20 |
| 2013/0321390 | A1 * | 12/2013 | Latta ................... G06F 16/9038 345/419 |
| 2019/0236403 | A1 | 8/2019 | Lilley et al. |

* cited by examiner

*Primary Examiner* — Said Broome
(74) *Attorney, Agent, or Firm* — The Marbury Law Group, PLLC.

(57) ABSTRACT

Systems, methods, devices, and non-transitory media of the various embodiments enable for updating a point cloud, such as a two-and-a-half-dimensional (2.5D) point cloud. Various embodiments include receiving two point clouds, such as a base point cloud of a terrain area and a new point cloud of the terrain area, and fusing the received two point clouds to generate an up-to-date point cloud, such as an up-to-date point cloud model of the terrain. Various embodiments may be especially useful in generating models of terrain areas, such as construction sites, earthwork projects, shorelines, etc., surveyed by surveying technologies, such as drone-based aerial photogrammetry systems, Light Detection and Ranging (LiDAR) systems, etc.

27 Claims, 15 Drawing Sheets

SYSTEMS AND METHODS FOR APPLYING PARTIAL UPDATES TO POINT CLOUD TERRAIN

RELATED APPLICATIONS

This application claims priority to U.S. Provisional Application No. 62/938,700 filed on Nov. 21, 2019 entitled "Systems And Methods For Applying Partial Updates To Point Cloud Terrain," the entire contents of which are hereby incorporated by reference.

BACKGROUND

The increased availability of surveying technologies, such as drone-based aerial photogrammetry systems, Light Detection and Ranging (LiDAR) system, and high-precision positioning sensors (e.g., high-precision Global Positioning System (GPS) based systems, "lighthouse" or beacon based reference based positional systems, inside-outside tracking systems, etc.) have led to increased demand for virtual models of real-world terrain.

Capturing frequent surveys of terrain can be useful for monitoring and visualizing changes to terrain over time, such as in visualizing progress in earthworks projects, visualizing weather-related damage to coastlines, etc. However, surveying the entire area of interest very frequently (such as on the order of every hour or shorter time intervals) may be impractical, and may be unnecessary if only a small portion of the total area of interest changes in the sampling interval. For example, workers in an earthworks project may only change a portion of the site in each hour. Such small portions may be easier to survey, either simply due to the reduced area or due to suitable alternative measurement methods, such as surveying equipment mounted directly on earthworks machines.

SUMMARY

The systems, methods, devices, and non-transitory media of the various embodiments may enable for updating a point cloud, such as a two-and-a-half-dimensional (2.5D) point cloud. Various embodiments include receiving two point clouds, such as a base point cloud of a terrain area and a new point cloud of the terrain area, and fusing the received two point clouds to generate an up-to-date point cloud, such as an up-to-date point cloud model of the terrain. Various embodiments may be especially useful in generating models of terrain areas, such as construction sites, earthwork projects, shorelines, etc., surveyed by surveying technologies, such as drone-based aerial photogrammetry systems, Light Detection and Ranging (LiDAR) systems, etc.

Various embodiment may include receiving a base point cloud, receiving a new point cloud, determining any overlap between the base point cloud and the new point cloud, updating overlapped base points in the base point cloud, and outputting a single point cloud based at least in part on the updated base point cloud and the new point cloud.

Various aspects include a device including a processor configured with processor-executable instructions to perform operations of any of the methods summarized above. Various aspects also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

Figure 1:
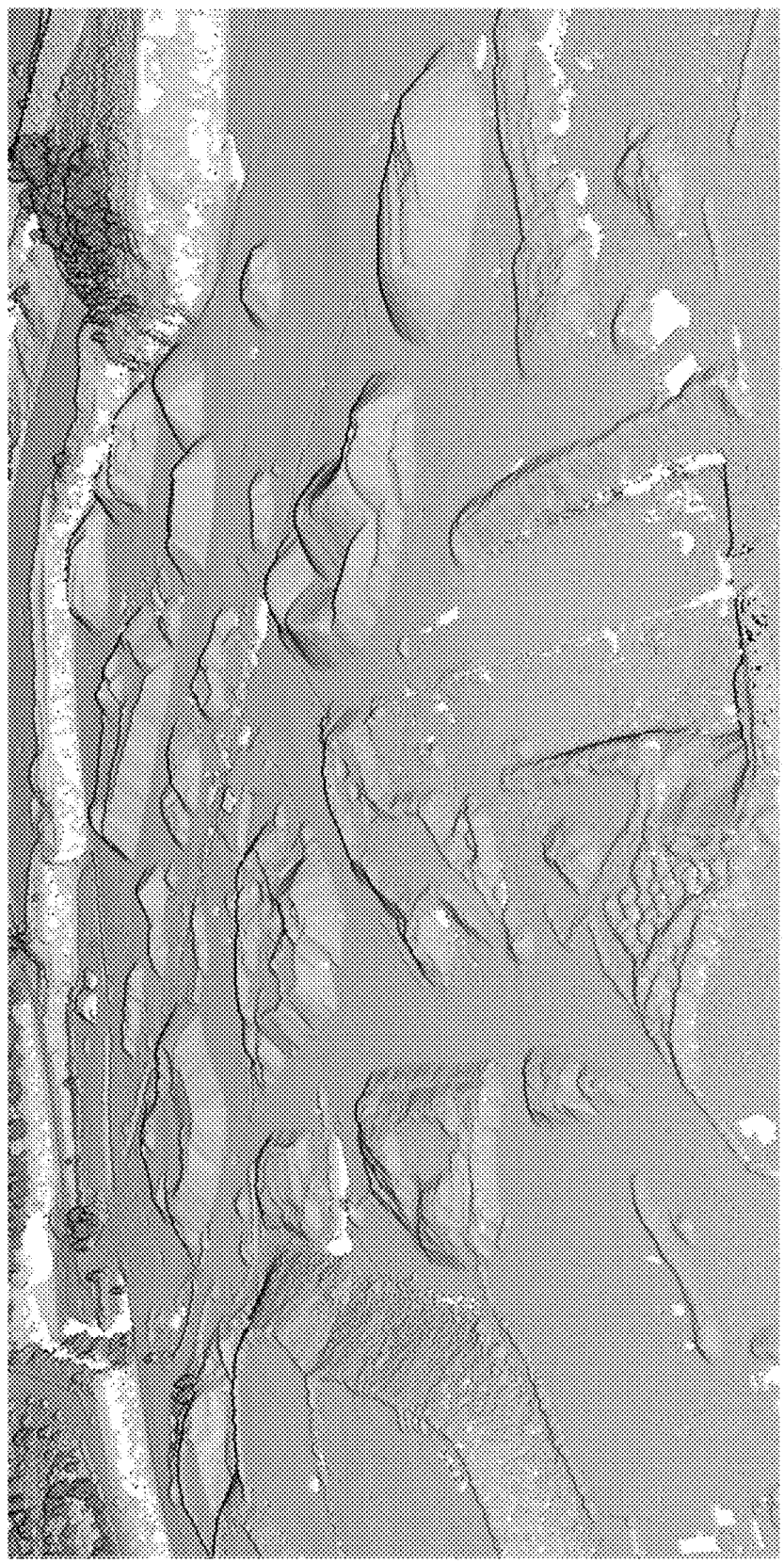
FIG. 1 illustrates a 2.5D point cloud of a construction site.
Figure 2:
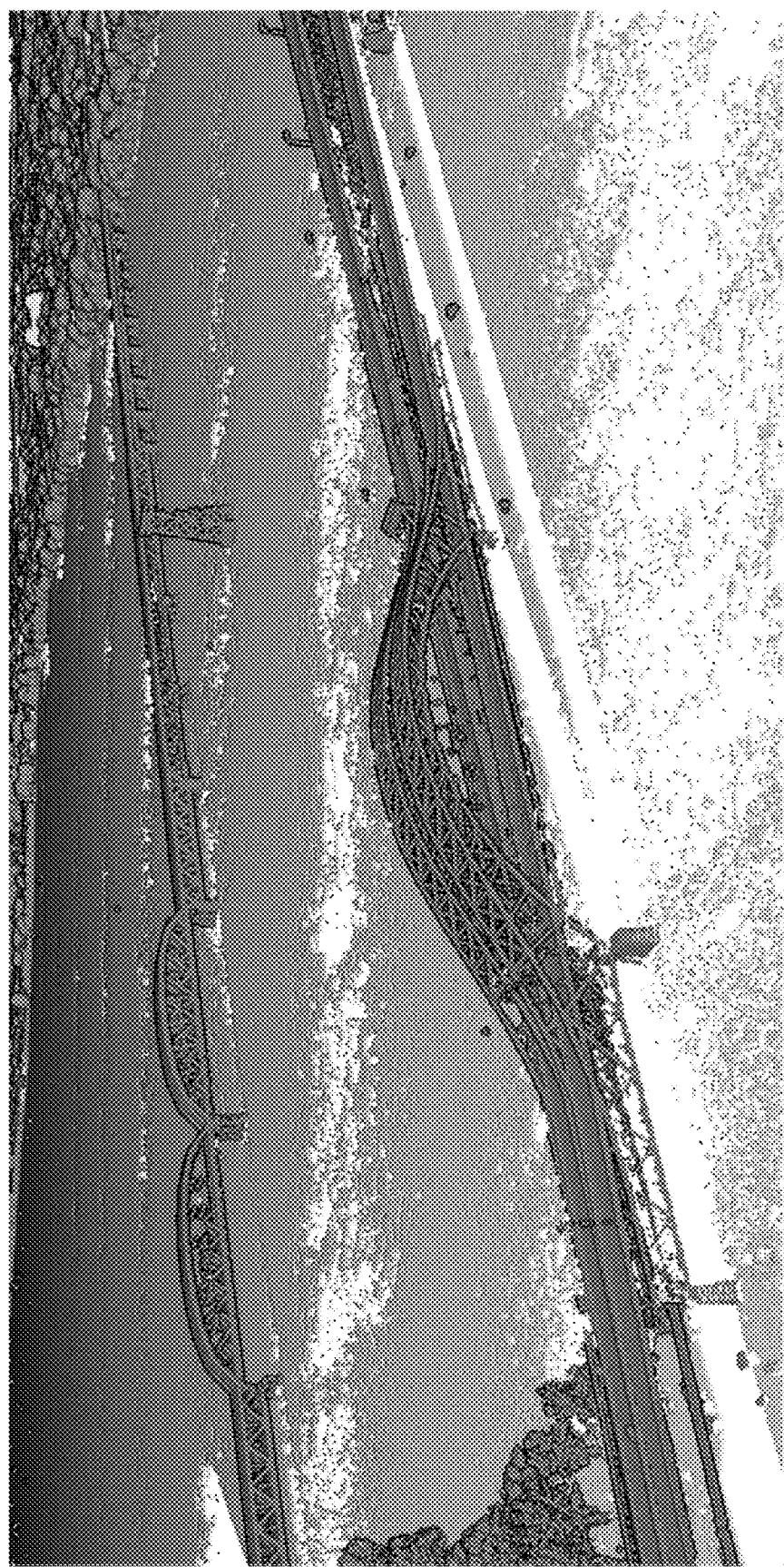
FIG. 2 illustrates a 3D point cloud of bridges over a river.

The term "point cloud" as used herein refers to a set of points, where each point is designated by a position in space and optional attributes, such as color, intensity, and classification. Point clouds are often collected using LiDAR or photogrammetry techniques for the purpose of constructing a virtual representation of the surface of a surveyed site. Point clouds often represent three-dimensional (3D) or two-and-a-half-dimensional (2.5D) surfaces. A 2.5D surface may be a surface where each planar coordinate defined position (e.g., each x and y coordinate defined position) maps to a single out of plane value (e.g., a single z coordinate (i.e., height)). For example, FIG. 1 illustrates a 2.5D point cloud of a construction site. Each x,y defined position in FIG. 1 has only a single z value. In contrast to the 2.5D point cloud of FIG. 1, FIG. 2 illustrates a 3D point cloud of bridges over a river. As seen in FIG. 2, the overlapping structures result in x,y defined positions having multiple z values. A common example of a 2.5D surface in the geospatial field is raster terrain where each pixel in the image (i.e., each pixel defining a position for the terrain) maps to a single height value forming a "heightmap" of the surface (i.e., a height for each pixel). Another example is aerial LiDAR that has captured a section of terrain without structures like bridges, arches, or overhangs. The examples of various embodiments are discussed herein with a focus primarily on such 2.5D point cloud data, but the various embodiments may be applicable to other type date.

The term "triangulation" is used herein to refer to any method that converts a point cloud into a triangle mesh by linking groups of three points to form triangles. Triangulations are often more useful if the triangles generated do not overlap each other and meet metrics for compactness, as in the case of Delaunay triangulation. Triangulations may also be measured by metrics such as concavity or hole-preservation.

As used herein the term "raster" is used to refer to a finite grid of two-dimensional (2D) values covering a space. Using a function for mapping 2D positions to pixel coordinates, rasters can provide very rapid access to data values "near" a given position. This can be useful for techniques such as checking for a given point in a point cloud to determine whether there is likely a nearby point in an overlapping point cloud.

Computer graphics, and especially three-dimensional visualization, is a rapidly developing computing technology finding new applications in many different industries, including geospatial, defense, and entertainment.

Capturing frequent surveys of terrain can be useful for monitoring and visualizing changes to terrain over time, such as in visualizing progress in earthworks projects, visualizing weather-related damage to coastlines, etc.

However, surveying the entire area of interest very frequently (such as on the order of every hour or shorter time intervals) may be impractical, and may be unnecessary if only a small portion of the total area of interest changes in the sampling interval.

Given small sub-surveys covering the changed portions, various embodiments provide a method for performing efficient partial updates of a site-wide point cloud model. By enabling partial updates of a site-wide point cloud model with data of less than the full site, various embodiments may enable many snapshots of the terrain in time to be leveraged for reflecting terrain changes over time with fewer full surveys of a site being required than in current systems. Additionally, various embodiments may preserve per-survey metadata to allow for filtering and styling the points in a visualization engine.

The systems, methods, devices, and non-transitory media of the various embodiments may enable applying partial updates to point cloud terrain. Various embodiments include receiving two point clouds, such as a base point cloud of a terrain area and a new point cloud of the terrain area, and fusing the received two point clouds to generate an up-to-date point cloud, such as an up-to-date point cloud model of the terrain.

Various embodiments may provide a method for partially updating a base point cloud, such as a base point cloud representing a 2.5D surface, with a new point cloud (e.g., a new 2.5D point cloud), such that areas of the surface with data overlap between the base point cloud and new point cloud (e.g., between the base 2.5D point cloud and new 2.5D point cloud) may represent the surface with new data from the new point cloud instead of the base data from the base point cloud (e.g., with new data from the new 2.5D point cloud instead of the base data from the base 2.5D point cloud). Various embodiments may include construction of a raster map of binary values for a new point cloud (e.g., a new 2.5D point cloud). In some embodiments, point cloud splatting may be used to construct the raster map of binary values for the new point cloud (e.g., the new 2.5D point cloud). In some embodiments, triangulation may be used to construct the raster map of binary values for the new point cloud (e.g., the new 2.5D point cloud). In various embodiments, raster map construction may be performed using streaming. Raster map construction using streaming may be particularly useful in a computing system configured with less memory than is necessary for holding the entire new point cloud (e.g., the entire new 2.5D point cloud) in memory at once based on a data size of the new point cloud (e.g., the byte size of the new 2.5D point cloud is larger than the byte size capacity of the memory and/or the free byte space of the memory). In various embodiments, triangulation for raster map construction may also be performed in chunks. Various embodiments may include using the raster map to quickly determine if points in the base point cloud (e.g., the base 2.5D point cloud) are overlapped by points in the new point cloud (e.g., the new 2.5D point cloud) and have therefore been replaced. In various embodiments, filtering base points of the base point cloud (e.g., the base 2.5D point cloud) may be performed using streaming. Filtering base points of the base point cloud (e.g., the 2.5D point cloud) may be particularly useful in a computing system configured with less memory than is necessary for holding the entire base point cloud (e.g., the entire base 2.5D point cloud) in memory at once based on a data size of the base point cloud (e.g., the byte size of the base 2.5D point cloud is larger than the byte size capacity of the memory and/or the free byte space of the memory).

In various embodiments, the overlap coordinates (or positions) between the new point cloud and the base point cloud may be determined. Any suitable overlap detection approach may be applied in various embodiments. In general, overlap detection techniques, often referred to as overlap detection algorithms, increase in complexity as are more computationally expensive moving from 2D spaces, to 2.5D spaces, and to 3D spaces (e.g., 3D space overlap detection is more complex and more computationally expensive than 2D space overlap detection in general). Some embodiments may provide an overlap detection algorithm that operates in 2D space and is therefore also suitable for 2.5D point clouds typical of terrain surveys. While specific overlap detection techniques are discussed herein, the overlap detection technique used in any embodiment is not strictly limited and other overlap detection algorithms may be used with various embodiments.

In a specific embodiment, overlap may be detected between the base point cloud and the new point cloud by constructing a raster map of points in the new point cloud. Each pixel in the raster map contain a binary occupancy value. The resolution of the raster map may be predetermined by the user, or may be automatically computed by estimating the average interpoint distance in either the new point cloud, the base point cloud, or both. Large raster maps with many pixels may also be implemented using more compact techniques in memory than simple arrays, for example, using hash maps or quadtrees. The raster map may be constructed by iterating over all the points in the new point cloud and computing for each point the pixel that contains that point, then marking that pixel as occupied. This method is often referred to as "splatting" since conceptually the method reduces (sometimes referred to as "squishes") 2.5D or 3D points into 2D. Splatting may be implemented and integrated into existing data pipelines that provide access to the individual points in large point cloud datasets.

In scenarios in which the raster resolution is much finer than the new point cloud resolution, the resulting raster map may be incomplete, consisting of dots of occupancy instead of contiguous patches. In such a situation, in some embodiments, the points may be given width and height in 2D, allowing them to touch multiple raster cells.

Alternatively, to attempt to avoid such incomplete raster maps, in some embodiments, the raster map may be constructed by first triangulating the new point cloud, and then checking which pixels are touched by each triangle in the triangulation. Triangulation may be performed using any suitable triangulation method. Triangulation may be more reliable at automatically producing raster maps so long as the triangulation method selected preserves the shape of the surface in 2D. For example, Delaunay triangulation produces a convex hull. In the example of a point cloud of an island with a distinct coastline, the convex hull would lack any concavities in the coastline, instead falsely indicating that there is surface data over inlets and coves. In this situation, filtering triangles out of the triangulation may preserve concavities. Accordingly, in some embodiments, triangles may be filtered out of the triangulation prior to checking which pixels are touched by each triangle in the triangulation.

Generating the raster map may not require a perfectly watertight triangulation for the entire point cloud. This lack of a need for a perfectly watertight triangulation for the entire point cloud may be useful in scenarios in which the new point cloud is too large to hold in the memory available to the computing system, as the new point cloud can be spatially partitioned into somewhat overlapping regions that individually can fit in the available memory. For example, the lack of a need for a perfectly watertight triangulation for the entire point cloud may be useful in scenarios in which the byte size of the new 2.5D point cloud is larger than the byte size capacity of the memory and/or the free byte space of the memory. In various embodiments, each region may be triangulated independently and added to the raster map. Independent triangulation of separate regions may also accelerate the raster map generation by enabling the computing system take advantage of multi-processing unit systems (e.g., multi-central processing unit (CPU) systems, multi-graphics processing unit (GPU) systems, etc.) triangulating independent regions simultaneously in parallel. For example, a first region of the new 2.5D point cloud may be handled by a first processing unit and a second region of the new 2.5D point cloud may be handled by a second processing unit. The triangulation of the first and second region may proceed simultaneously in parallel on each respective one of the first and second processing units such that no interaction between the first and second processing unit may be required during the triangulations.

In various embodiments, after the raster map has been constructed, points in the base point cloud may be checked against the raster map to determine whether the points in the base point cloud have been replaced by data in the new point cloud. The raster map check may be significantly faster than checking each point in the base point cloud directly against points in the new point cloud to determine whether any points in the new point cloud are near enough to points in the base point cloud to qualify as replacement points. This faster nature of the raster map check in comparison to a direct check of the base and new point clouds themselves may be especially true in scenarios in which the new point cloud contains a large number of points and/or contains more points than can be held in the memory available to the computing system (e.g., the byte size of the base 2.5D point cloud is larger than the byte size capacity of the memory and/or the free byte space of the memory).

In various embodiments, base points that touch occupied pixels in the raster map may be removed from the dataset before output, or may have metadata added indicating that such base points touching occupied pixels have recently been replaced, allowing a runtime engine to style or hide these base points on the fly. The modified base point cloud and new point cloud may then be output as a single point cloud and/or may be further processed using various processing methods, such as those described in U.S. Patent Application Publication No. 2019/0236403 entitled "Systems and Methods for Converting Massive Point Cloud Datasets to a Hierarchical Storage Format" the entire contents of which are hereby incorporated by reference for all purposes.

Figure 3:
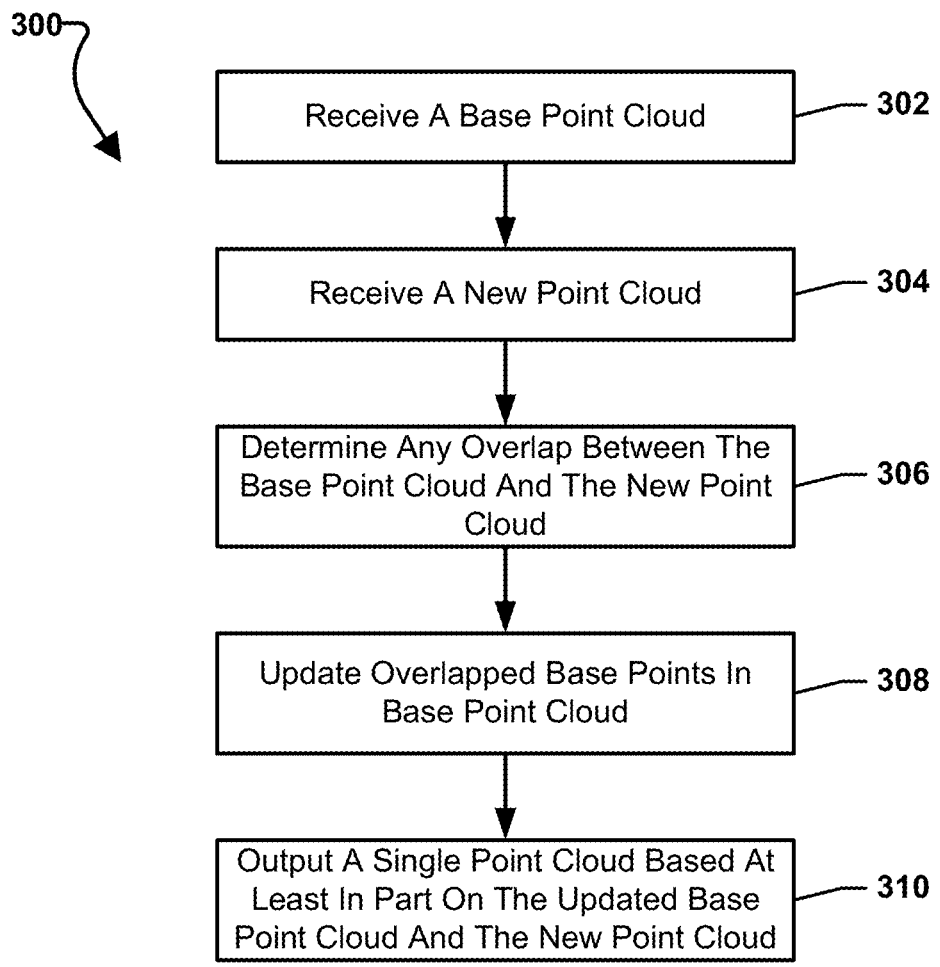
FIG. 3 is a process flow diagram illustrating a method for updating a point cloud in accordance with various embodiments.

FIG. 3 illustrates a method 300 for updating a point cloud, such as a 2.5D point cloud, in accordance with various embodiments. In various embodiments, the operations of method 300 may be performed by a component of a computing device, such as a CPU, GPU, etc. The operations of method 300 may produce point cloud data structure that may enable a single point cloud data set, such a 2.5D large-area survey, to be rendered on a display.

Figure 4:
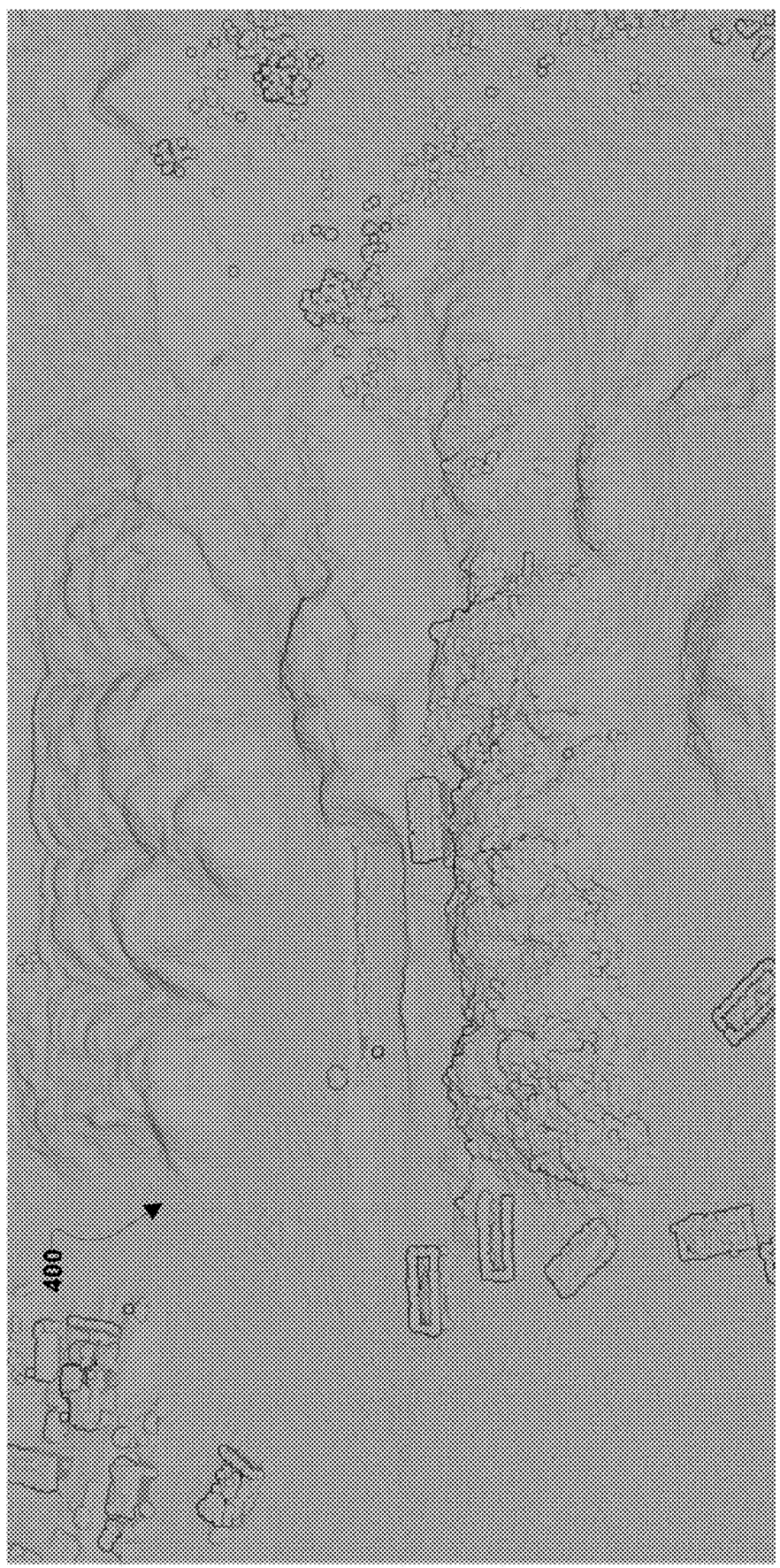
FIG. 4 illustrates a 2.5D point cloud model of an initial large-area survey of an earthworks project.

In block 302, the computing device may receive a base point cloud. As an example, the base point cloud may be a 2.5D point cloud, such as a 2.5D point cloud of a large-area survey collected using LiDAR or photogrammetry techniques for the purpose of constructing a virtual representation of the surface of a surveyed site. For ease of reference, points in the received base point cloud may be referred to as base points. As a specific example, FIG. 4 illustrates a 2.5D point cloud model of an initial large-area survey 400 of an earthworks project. For example, the base point cloud may represent a large-area survey before an excavation of a portion of the earthworks project occurred. While discussed in relation to a 2.5D point cloud, the operations of method 300 are not limited to being performed in relation to 2.5D point clouds, and other dimensional point clouds, such as 2D point clouds, 3D point clouds, etc., may be substituted for the example 2.5D point clouds.

In block 304, the computing device may receive a new point cloud. As an example, the new point cloud may be a 2.5D point cloud, such as a 2.5D point cloud of an area collected using LiDAR or photogrammetry techniques for the purpose of constructing a virtual representation of the surface of a surveyed site. For ease of reference, points in the new point cloud may be referred to as new points. The new point cloud may cover the entire area of the base point cloud received in block 302 or may be a partial portion covering less than the entire area of the base point cloud received in block 302. As a specific example, the new point cloud may be a 2.5D point cloud resulting from a survey of an excavated area of a portion of the earthworks project covered by the initial large-area survey 400, such as a survey of a dug out foundation area, mining area, etc.

In block 306, the computing device may determine any overlap between the base point cloud and the new point cloud. In various embodiments, the overlap coordinates (or positions) between the new point cloud and the base point cloud may be determined. Any suitable overlap detection approach may be applied in various embodiments to determine any overlap between the base point cloud and the new point cloud. For example, overlap techniques as discussed with reference to FIGS. 7-13 below may be used to determine any overlap between the base point cloud and the new point cloud. While specific overlap detection techniques are discussed herein, the overlap detection technique used in any embodiment is not strictly limited and other overlap detection algorithms may be used with various embodiments.

Figure 5:
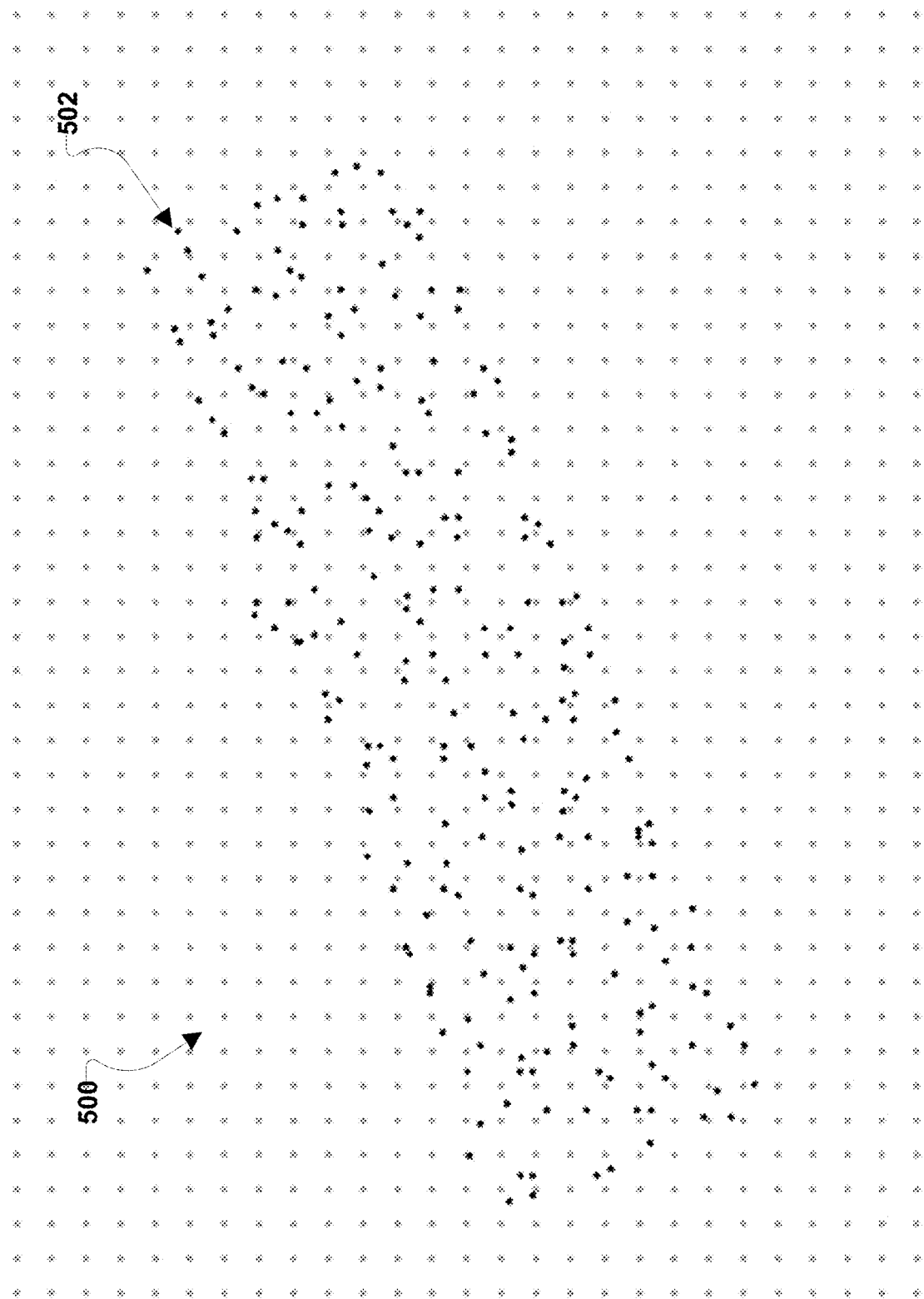
FIG. 5 illustrates a new point cloud overlaid directly on top of a base point cloud in accordance with various embodiments.

As an example, FIG. 5 illustrates a new point cloud 502 overlaid directly on top of a base point cloud 500 in accordance with various embodiments. From the overlay of the new point cloud 502 and the base point cloud 500, the overlap between the base point cloud 500 and the new point cloud 502 may be determined.

In block 308, the computing device may update the overlapped base points in the base point cloud. In various embodiments, base points that are determined to be overlapped by new points in the new point cloud may be removed from the dataset that is the base point cloud before output. For example, such overlapped base points may be overwritten with data from the new points that overlap the base points. In various embodiments, base points that are determined to be overlapped by new points in the new point cloud may have metadata added indicating that such overlapped base points have recently been replaced, allowing a runtime engine to style or hide these base points on the fly.

Figure 6:
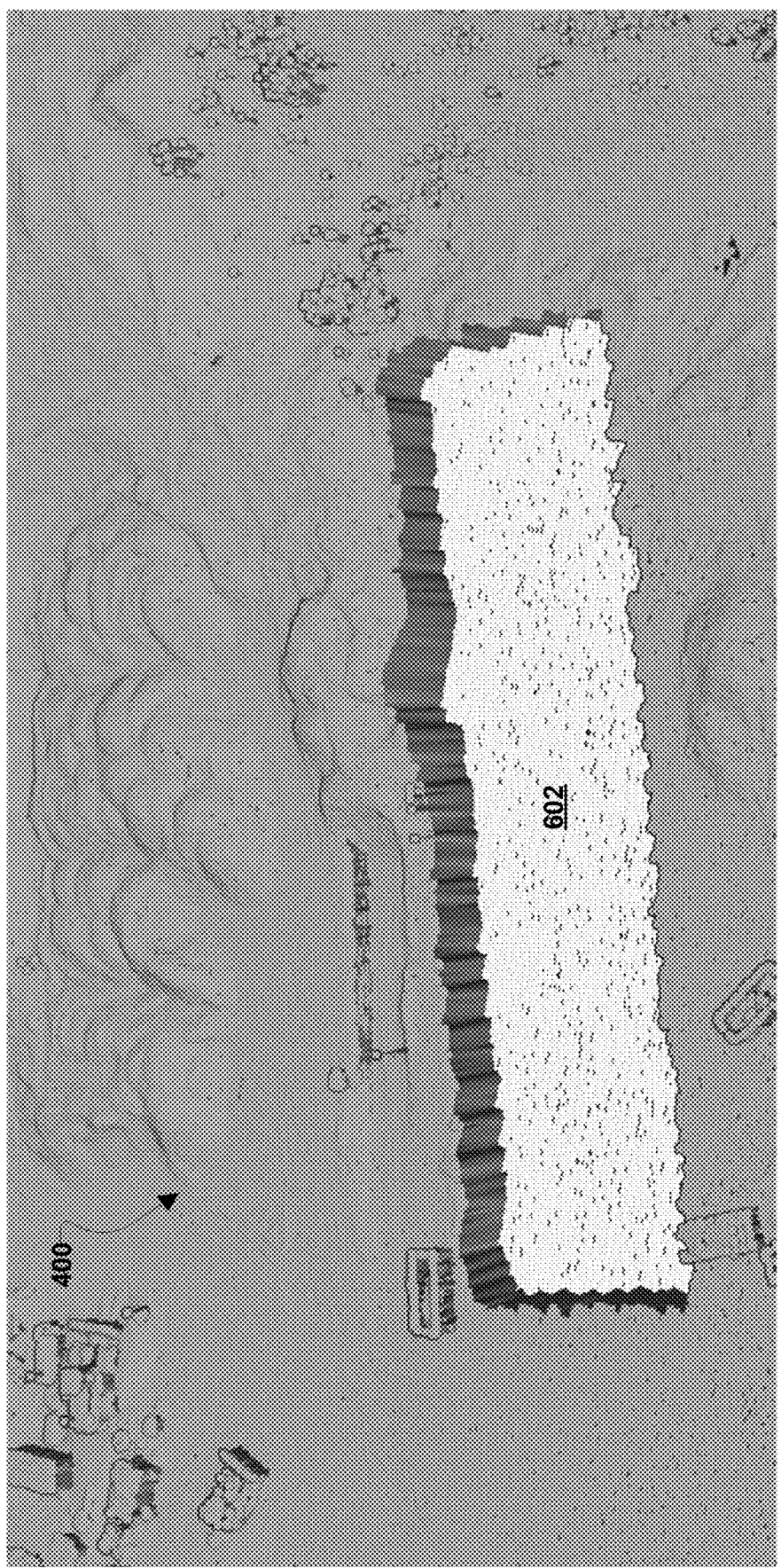
FIG. 6 illustrates an excavated area merged into the initial large-area survey of FIG. 4 as a partial update in accordance with various embodiments.

In block 310, the computing device may output a single point cloud based at least in part on the updated base point cloud and the new point cloud. For example, the modified base point cloud and new point cloud may be output as a single point cloud and/or may be further processed using various processing methods, such as those described in U.S. Patent Application Publication No. 2019/0236403. As an example, the single point cloud of the base point cloud having the overlapped base points replaced with the new points from the new point cloud may be output as a single point cloud (e.g., a partially updated single point cloud having both base points and new points that replaced overlapped base points). As a specific example, FIG. 6 illustrates an excavated area 602 merged into the initial large-area survey 400 of FIG. 4 as a partial update that may be output as a single point cloud for rendering. In various embodiments, outputting the single point cloud based at least in part on the updated base point cloud and the new point cloud may include rendering data of the single point cloud on a display as a 2.5D model in a graphical user interface.

Figure 7:
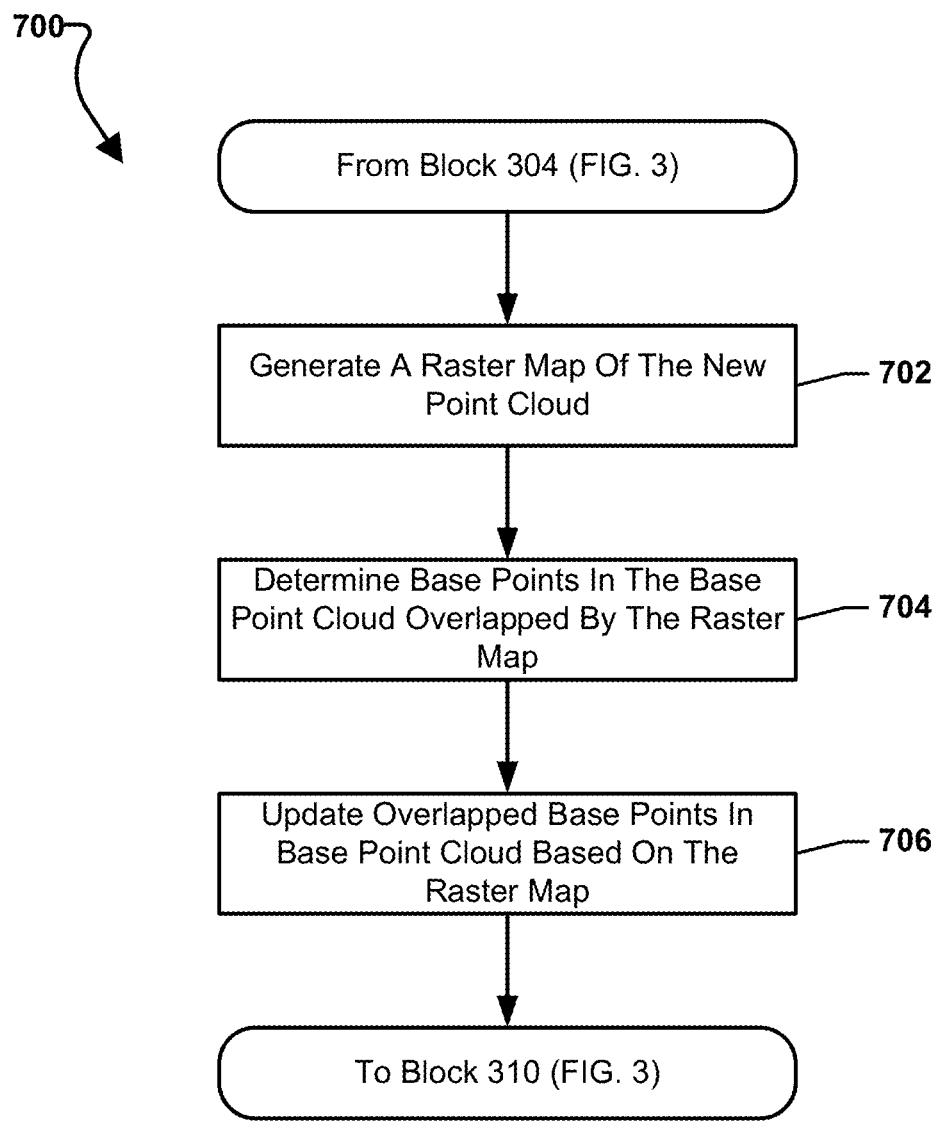
FIG. 7 illustrates a method for updating a point cloud in accordance with various embodiments.

FIG. 7 illustrates a method 700 for updating a point cloud, such as a 2.5D point cloud, in accordance with various embodiments. In various embodiments, the operations of method 700 may be performed by a component of a computing device, such as a CPU, GPU, etc. In various embodiments, the operations of method 700 may be performed in conjunction with the operations of method 300 (FIG. 3). For example, the operations of method 700 may be performed as part of the operations to determine any overlap between the base point cloud and the new point cloud in block 306 and/or to update the overlapped base points in the base point cloud in block 308.

In block 702, the computing device may generate a raster map of the new point cloud. Various embodiments may include construction of a raster map of binary values for a new point cloud (e.g., a new 2.5D point cloud). In some embodiments, the raster map may be of a resolution selected by a user. In some embodiments, the raster map may be of a resolution computed based on an interpoint distance of the base point cloud, the new point cloud, or both the base point cloud and the new point cloud. Large raster maps with many pixels may also be implemented using more compact techniques in memory than simple arrays, for example, using hash maps or quadtrees.

In various embodiments, raster map construction may be performed using streaming. Raster map construction using streaming may be particularly useful in a computing system configured with less memory than is necessary for holding the entire new point cloud (e.g., the entire new 2.5D point cloud) in memory at once based on a data size of the new point cloud (e.g., the byte size of the new 2.5D point cloud is larger than the byte size capacity of the memory and/or the free byte space of the memory). By using streaming, different portions of the raster map, such as two, three, four, or more portions of the raster map may be generated independently. For example, two different portions of the raster map of the new point cloud may be generated in a memory independently of one another and at different times.

Figure 8:
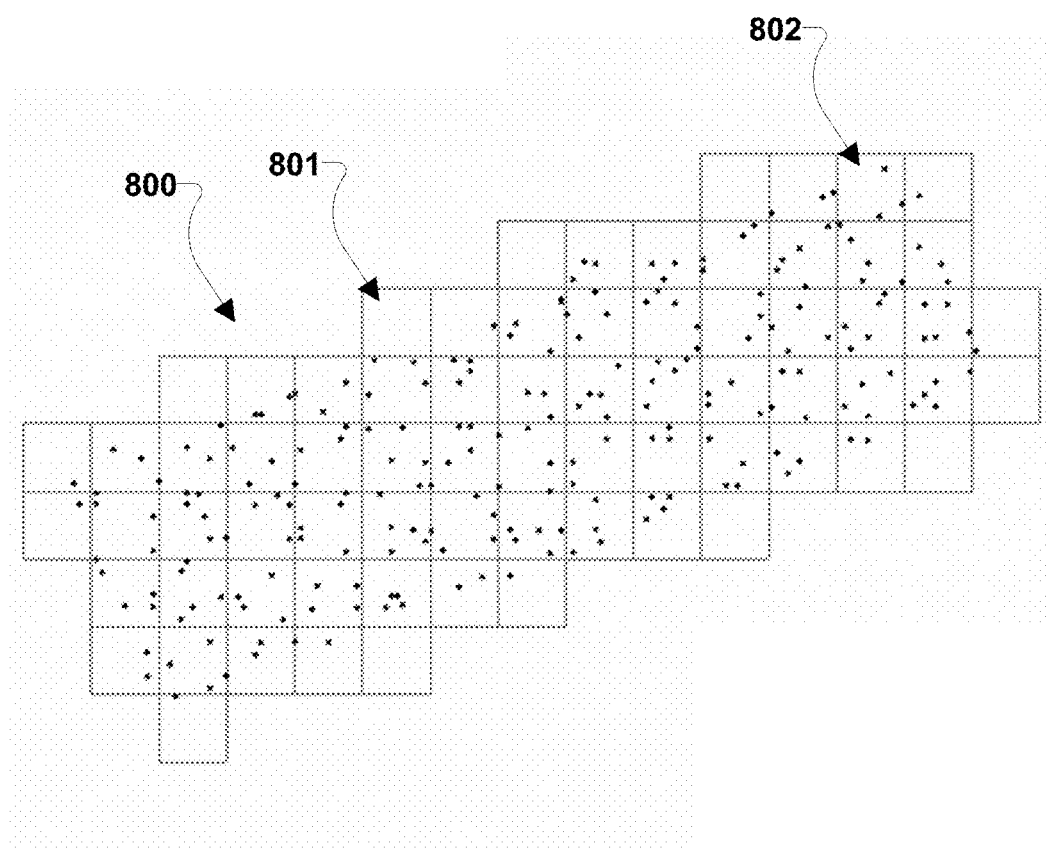
FIG. 8 illustrates an example of a raster map generated by splatting points from a new point cloud onto a grid.

In some embodiments, point cloud splatting may be used to construct the raster map of binary values for the new point cloud (e.g., the new 2.5D point cloud). For example, generating the raster map of the new point cloud may include identifying pixels of the raster map containing at least one point of the point cloud as occupied pixels of the raster map. The raster map may be constructed by iterating over all the points in the new point cloud and computing for each point the pixel that contains that point, then marking that pixel as occupied. This method is often referred to as "splatting" since conceptually the method reduces (sometimes referred to as "squishes") 2.5D or 3D points into 2D. Splatting may be implemented and integrated into existing data pipelines that provide access to the individual points in large point cloud datasets. FIG. 8 illustrates an example of a raster map 800 generated by splatting points from a new point cloud onto a grid. FIG. 8 illustrates that some pixels of the grid, such as pixel 801, may not contain splatted points and are therefore unoccupied, which other pixels of the grid, such as pixel 802, may contain splatted points and are therefore identified as occupied pixels.

Figure 9A:
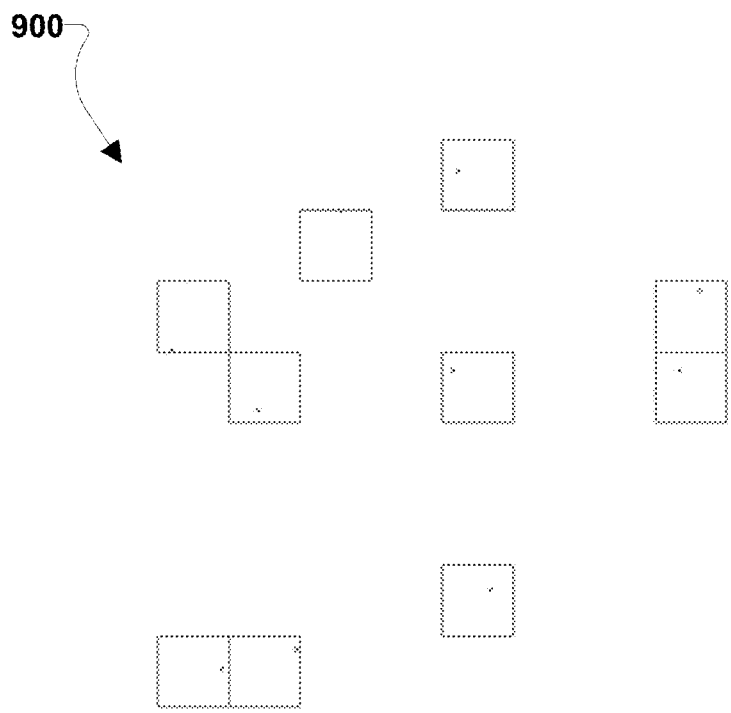
FIG. 9A illustrates an example raster map that may be considered to have failed due to sparse points.
Figure 9B:
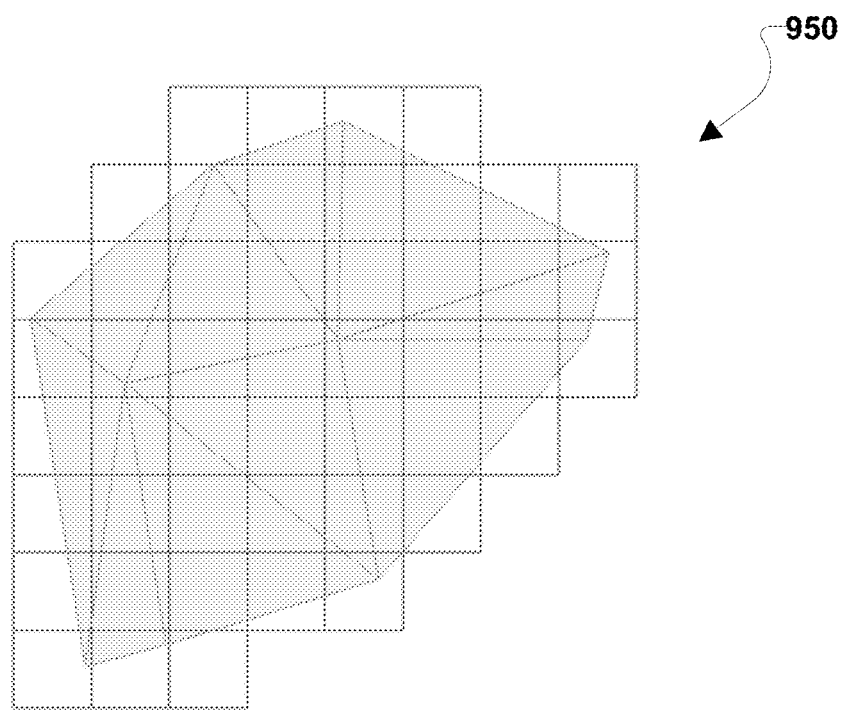
FIG. 9B illustrate example raster map that may be considered to have succeeded from a triangulation of sparse points.

In scenarios in which the raster resolution is much finer than the new point cloud resolution, the resulting raster map may be very incomplete, consisting of dots of occupancy instead of contiguous patches. For example, such an incomplete raster map 900 is illustrated in FIG. 9A. In such a situation, the points may be given width and height in 2D, allowing them to touch multiple raster cells. Alternatively, the raster map may be constructed by first triangulating the new point cloud, and then checking which pixels are touched by each triangle in the triangulation as illustrated in FIG. 9B for raster map 950.

Figure 10:
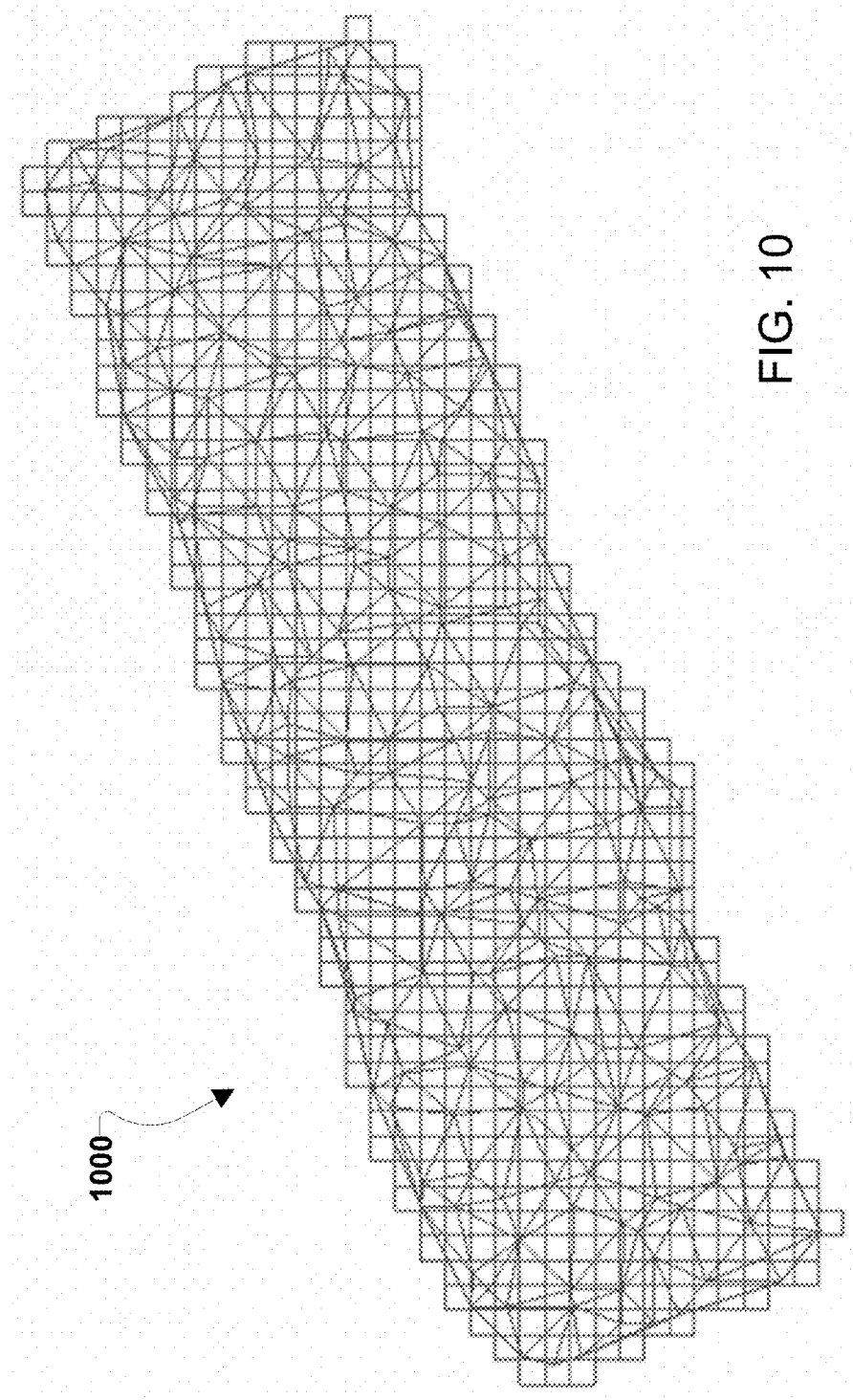
FIG. 10 illustrates a higher-resolution raster map created using triangulation.
Figure 11:
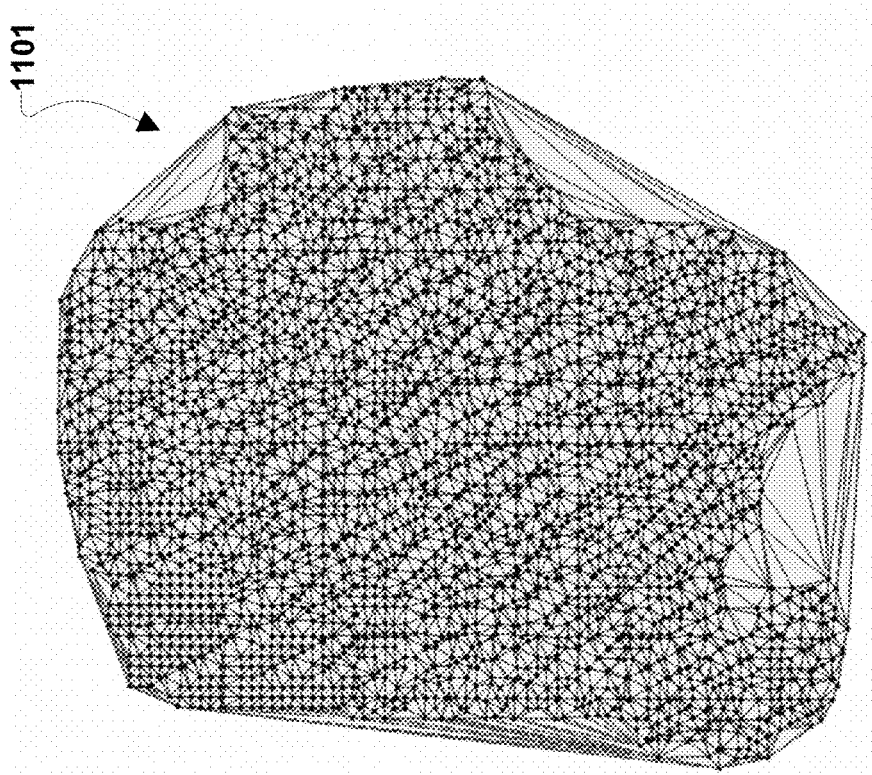
FIG. 11 illustrates a comparison between an unfiltered and filtered Delaunay triangulation of a point cloud.
Figure 11:
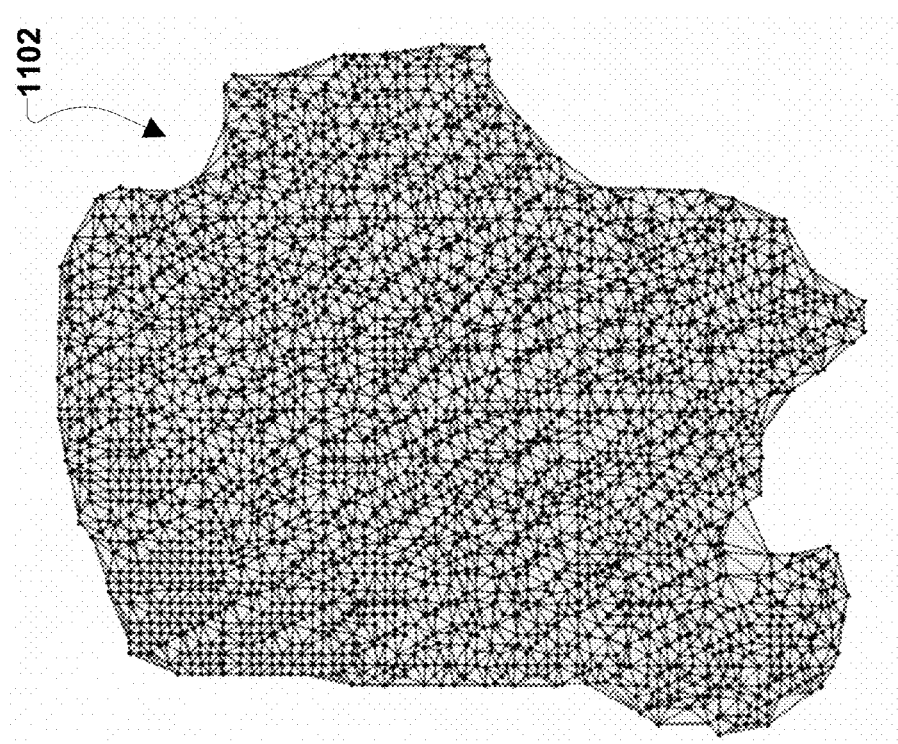

In some embodiments, triangulation may be used to construct the raster map of binary values for the new point cloud (e.g., the new 2.5D point cloud). For example, generating the raster map of the new point cloud may include triangulating the new point cloud and identifying pixels of the raster map touching at least one triangle of the triangulated new point cloud as occupied pixels of the raster map. FIG. 10 illustrates a higher-resolution raster map 1000 created by triangulating a new point cloud and checking which pixels of the raster map 1000 touch each triangle. Triangulation may be more reliable at automatically producing raster maps as long as the triangulation method selected preserves the shape of the surface in 2D. For example, Delaunay triangulation produces a convex hull. In the case of a point cloud of an island with a distinct coastline as illustrated in FIG. 11, the convex hull 1101 generated by Delaunay triangulation is illustrated on the left of FIG. 11 and would lack any concavities in the coastline, instead falsely indicating that there is surface data over inlets and coves. In this situation, filtering triangles out of the triangulation may preserve concavities as illustrated in the filtered version 1102 illustrated on the right of FIG. 11.

Generating the raster map may not require a perfectly watertight triangulation for the entire point cloud. This lack of a need for a perfectly watertight triangulation for the entire point cloud may be useful in scenarios in which the new point cloud is too large to hold in the memory available to the computing system, as the new point cloud can be spatially partitioned into somewhat overlapping regions that individually can fit in the available memory. For example, the lack of a need for a perfectly watertight triangulation for the entire point cloud may be useful in scenarios in which the byte size of the new 2.5D point cloud is larger than the byte size capacity of the memory and/or the free byte space of the memory. In various embodiments, each region may be triangulated independently and added to the raster map. Independent triangulation of separate regions may also accelerate the raster map generation by enabling the computing system take advantage of multi-processing unit systems (e.g., multi-central processing unit (CPU) systems, multi-graphics processing unit (GPU) systems, etc.) triangulating independent regions simultaneously in parallel. For example, a first region of the new 2.5D point cloud may be handled by a first processing unit and a second region of the new 2.5D point cloud may be handled by a second processing unit. The triangulation of the first and second region may proceed simultaneously in parallel on each respective one of the first and second processing units such that no interaction between the first and second processing unit may be required during the triangulations. In various embodiments, triangulation for raster map construction may be performed in chunks. By triangulating in chunks, different portions of the raster map, such as two, three, four, or more portions of the raster map may be generated independently. For example, identifying pixels of the raster map touching at least one triangle of the triangulated new point cloud as occupied pixels of the raster map may be performed in chunks such that at least two different triangles of the triangulated new point cloud are handled in a memory independently of one another and at different times.

In block 704, the computing device may determine base points in the base point cloud overlapped by the raster map. determining base points in the base point cloud overlapped by the raster map comprises determining at least two different base points in the base point cloud overlapped by the raster map in a memory independently of one another and at different times.

Figure 12A:
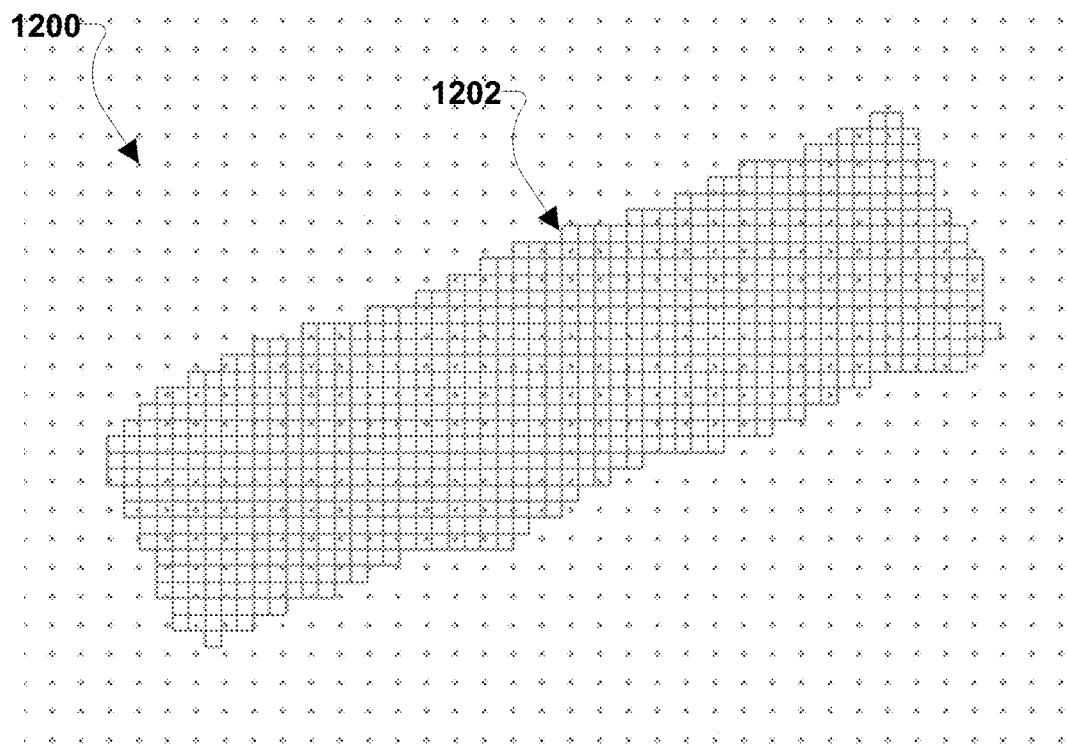
FIG. 12A illustrates a raster map overlaid on a base point cloud.
Figure 12B:
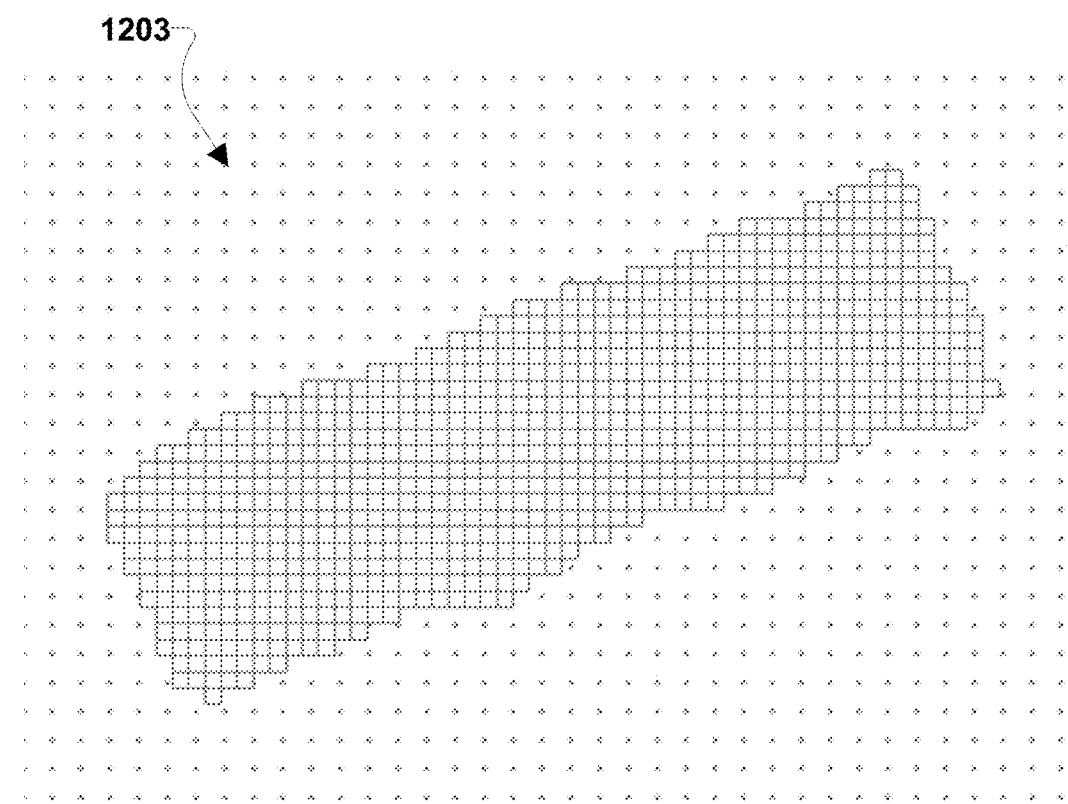
FIG. 12B illustrates base points from the base point cloud of FIG. 12A filtered out.

In block 706, the computing device may update base points in the base point cloud based on the raster map. In various embodiments, after the raster map has been constructed, points in the base point cloud may be checked against the raster map to determine whether the points in the base point cloud have been replaced by data in the new point cloud. For example, FIG. 12A illustrates points from the base point cloud 1200 with the raster map 1202 overlaid and FIG. 12B shows the points from the base point cloud filtered out wherever they touch the raster map to result in an updated base point cloud 1203. The raster map check may be significantly faster than checking each point in the base point cloud directly against points in the new point cloud to determine whether any points in the new point cloud are near enough to points in the base point cloud to qualify as replacement points. This faster nature of the raster map check in comparison to a direct check of the base and new point clouds themselves may be especially true in scenarios in which the new point cloud contains a large number of points and/or contains more points than can be held in the memory available to the computing system (e.g., the byte size of the base 2.5D point cloud is larger than the byte size capacity of the memory and/or the free byte space of the memory).

Various embodiments may include using the raster map to quickly determine if points in the base point cloud (e.g., the base 2.5D point cloud) are overlapped by points in the new point cloud (e.g., the new 2.5D point cloud) and have therefore been replaced. In various embodiments, filtering base points of the base point cloud (e.g., the base 2.5D point cloud) may be performed using streaming. Filtering base points of the base point cloud (e.g., the 2.5D point cloud) may be particularly useful in a computing system configured with less memory than is necessary for holding the entire base point cloud (e.g., the entire base 2.5D point cloud) in memory at once based on a data size of the base point cloud (e.g., the byte size of the base 2.5D point cloud is larger than the byte size capacity of the memory and/or the free byte space of the memory).

Figure 13:
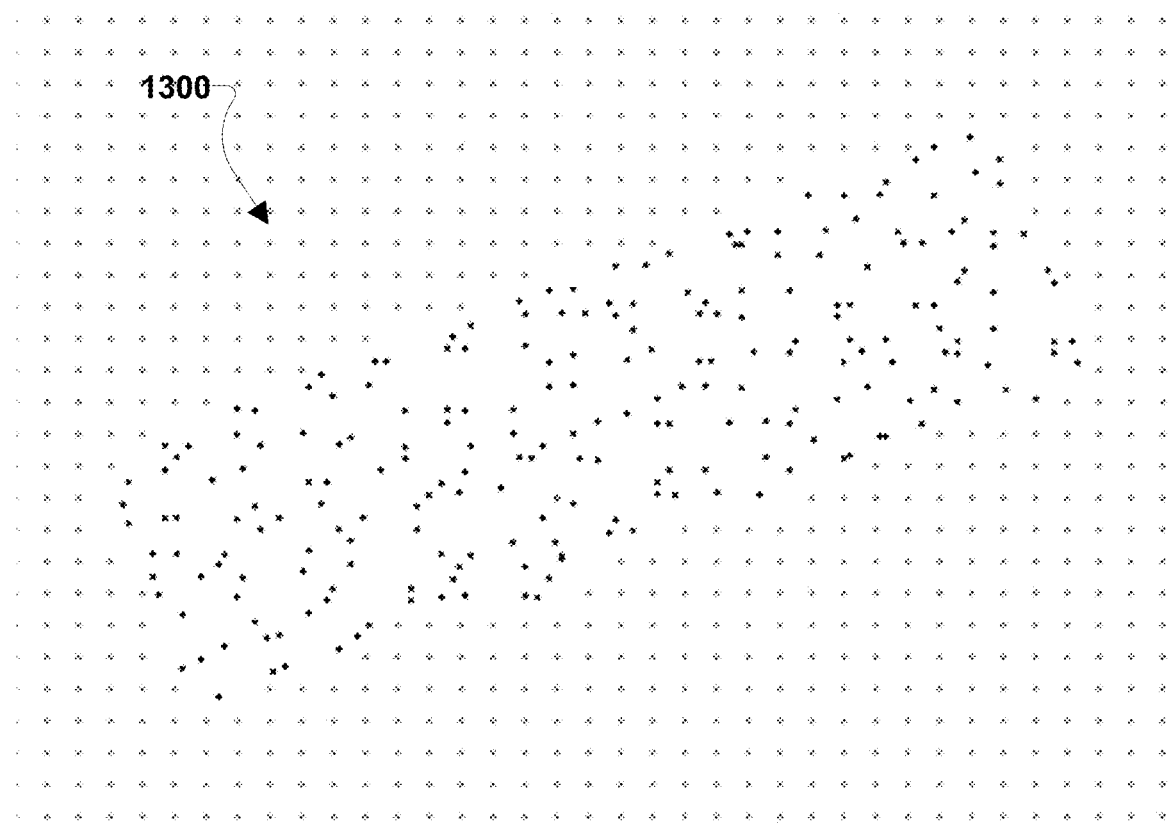
FIG. 13 illustrates a single combined point cloud of a base point cloud and a new point cloud.

As discussed with reference to block 310 of method 300 (FIG. 3) above, a single point cloud may be output. In various embodiments, base points that touch occupied pixels in the raster map may be removed from the dataset before output, or may have metadata added indicating that such base points touching occupied pixels have recently been replaced, allowing a runtime engine to style or hide these base points on the fly. The modified base point cloud and new point cloud may then be output as a single point cloud and/or may be further processed using various processing methods, such as those described in U.S. Patent Application Publication No. 2019/0236403. As a specific example, FIG. 13 illustrates a single combined point cloud 1300 of a base point cloud updated with a new point cloud according to the various embodiments.

Figure 14:
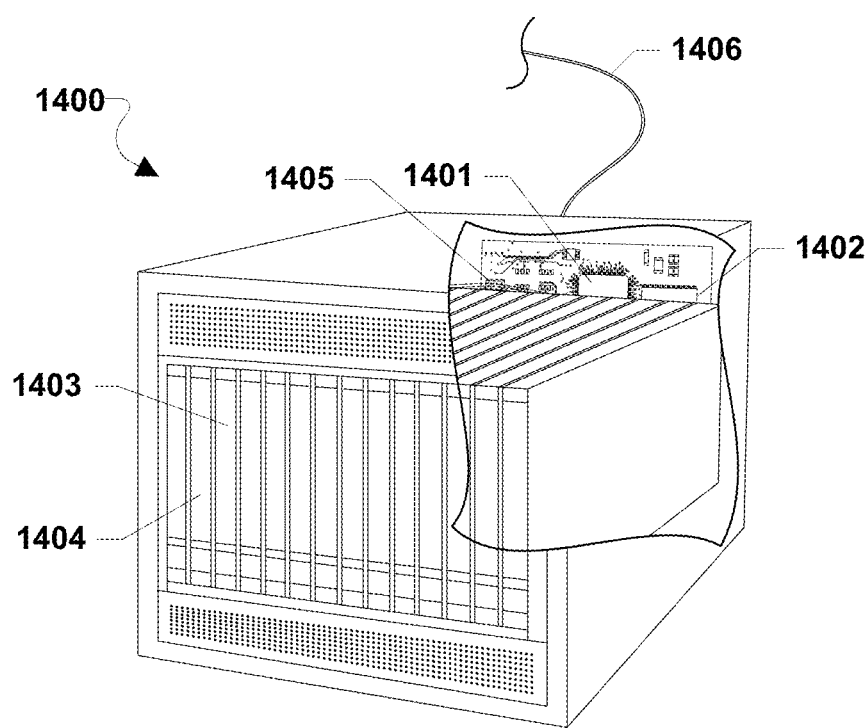
FIG. 14 is a component block diagram of a server that is a computing device suitable for use in the various embodiments.

The various embodiment methods may be performed partially or completely on a variety of computing devices, such as a server. Such embodiments may be implemented on any of a variety of commercially available server devices, such as the server 1500 illustrated in FIG. 14. Such a server 1400 typically includes a processor 1401 coupled to volatile memory 1402 and a large capacity nonvolatile memory, such as a disk drive 1403. The server 1400 may also include a floppy disc drive, compact disc (CD) or DVD disc drive 1404 coupled to the processor 1401. The server 1400 may also include network access ports 1405 coupled to the processor 1401 for establishing data connections with a network 1406, such as a local area network coupled to other broadcast system computers and servers. The processor 1401 may be any programmable microprocessor, microcomputer or multiple processor chip or chips that may be configured by software instructions (applications) to perform a variety of functions, including the functions of the various embodiments described above. Typically, software applications may be stored in the internal memory 1402, 1403 before they are accessed and loaded into the processor 1401. The processor 1401 may include internal memory sufficient to store the application software instructions.

Figure 15:
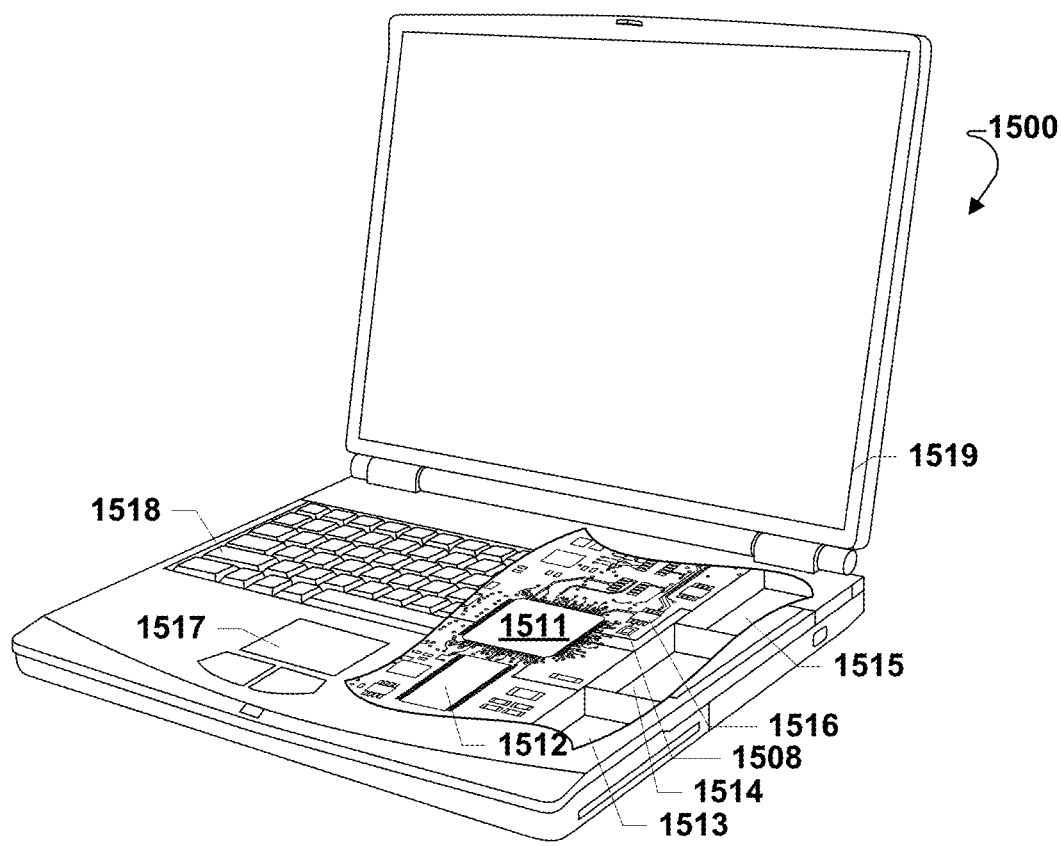
FIG. 15 is a component block diagram of a laptop that is a computing device suitable for use in the various embodiments.

The various embodiments described above may also be implemented within a variety of computing devices, such as a laptop computer 1500 illustrated in FIG. 15. Many laptop computers include a touchpad touch surface 1517 that serves as the computer's pointing device, and thus may receive drag, scroll, and flick gestures similar to those implemented on mobile computing devices equipped with a touch screen display and described above. A laptop computer 1500 will typically include a processor 1511 coupled to volatile memory 1512 and a large capacity nonvolatile memory, such as a disk drive 1513 of Flash memory. Additionally, the computer 1500 may have one or more antennas 1508 for sending and receiving electromagnetic radiation that may be connected to a wireless data link and/or cellular telephone transceiver 1516 coupled to the processor 1511. The computer 1500 may also include a floppy disc drive 1514 and a compact disc (CD) drive 1515 coupled to the processor 1511. In a notebook configuration, the computer housing includes the touchpad 1517, the keyboard 1518, and the display 1519 all coupled to the processor 1511. Other configurations of the mobile computing device may include a computer mouse or trackball coupled to the processor (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method for updating a point cloud, comprising:
receiving a base point cloud;
receiving a new point cloud;
determining any overlap between the base point cloud and the new point cloud, wherein determining any overlap between the base point cloud and the new point cloud comprises:
generating a raster map of the new point cloud; and
determining base points in the base point cloud overlapped by the raster map;
updating overlapped base points in the base point cloud, wherein updating overlapped base points in the base point cloud comprises updating overlapped base points in the base point cloud based on the raster map; and
outputting a single point cloud based at least in part on the updated base point cloud and the new point cloud.

2. The method of claim 1, wherein the raster map is of a resolution selected by a user.

3. The method of claim 1, wherein the raster map is of a resolution computed based on an interpoint distance of one or both of the base point cloud and the new point cloud.

4. The method of claim 1, wherein generating the raster map of the new point cloud comprises identifying pixels of the raster map containing at least one point of the point cloud as occupied pixels of the raster map.

5. The method of claim 1, wherein generating the raster map of the new point cloud comprises triangulating the new point cloud and identifying pixels of the raster map touching at least one triangle of the triangulated new point cloud as occupied pixels of the raster map.

6. The method of claim 5, wherein identifying pixels of the raster map touching at least one triangle of the triangulated new point cloud as occupied pixels of the raster map is performed such that at least two different triangles of the triangulated new point cloud are handled in a memory independently of one another and at different times.

7. The method of claim 1, wherein generating the raster map of the new point cloud comprises generating at least two different portions of the raster map of the new point cloud in a memory independently of one another and at different times.

8. The method of claim 1, wherein determining base points in the base point cloud overlapped by the raster map comprises determining at least two different base points in the base point cloud overlapped by the raster map in a memory independently of one another and at different times.

9. The method of claim 1, wherein the base point cloud and the new point cloud are 2.5D point clouds.

10. The method of claim 9, wherein outputting the single point cloud based at least in part on the updated base point cloud and the new point cloud comprises rendering data of the single point cloud on a display as a 2.5D model.

11. The method of claim 9, wherein the base point cloud and the new point cloud comprise survey data of a terrain area.

12. A computing device, comprising:
a graphic display; and
a processor connected to the graphic display, wherein the processor is configured with processor executable instructions to perform operations comprising:
receiving a base point cloud;
receiving a new point cloud;
determining any overlap between the base point cloud and the new point cloud, wherein determining any overlap between the base point cloud and the new point cloud comprises:
generating a raster map of the new point cloud; and
determining base points in the base point cloud overlapped by the raster map;
updating overlapped base points in the base point cloud, wherein updating overlapped base points in the base point cloud comprises updating overlapped base points in the base point cloud based on the raster map; and
outputting a single point cloud based at least in part on the updated base point cloud and the new point cloud.

13. The computing device of claim 12, wherein the raster map is of a resolution selected by a user.

14. The computing device of claim 12, wherein the raster map is of a resolution computed based on an interpoint distance of one or both of the base point cloud and the new point cloud.

15. The computing device of claim 12, wherein the processor is configured with processor executable instructions to perform operations such that generating the raster map of the new point cloud comprises identifying pixels of the raster map containing at least one point of the point cloud as occupied pixels of the raster map.

16. The computing device of claim 12, wherein the processor is configured with processor executable instructions to perform operations such that generating the raster map of the new point cloud comprises triangulating the new point cloud and identifying pixels of the raster map touching at least one triangle of the triangulated new point cloud as occupied pixels of the raster map.

17. The computing device of claim 16, wherein the processor is configured with processor executable instructions to perform operations such that identifying pixels of the raster map touching at least one triangle of the triangulated new point cloud as occupied pixels of the raster map is performed such that at least two different triangles of the triangulated new point cloud are handled in a memory independently of one another and at different times.

18. The computing device of claim 12, wherein the processor is configured with processor executable instructions to perform operations such that generating the raster map of the new point cloud comprises generating at least two different portions of the raster map of the new point cloud in a memory independently of one another and at different times.

19. The computing device of claim 12, wherein the processor is configured with processor executable instructions to perform operations such that determining base points in the base point cloud overlapped by the raster map comprises determining at least two different base points in the base point cloud overlapped by the raster map in a memory independently of one another and at different times.

20. The computing device of claim 12, wherein the base point cloud and the new point cloud are 2.5D point clouds.

21. The computing device of claim 20, wherein the processor is configured with processor executable instructions to perform operations such that outputting the single point cloud based at least in part on the updated base point cloud and the new point cloud comprises rendering data of the single point cloud on the graphic display as a 2.5D model.

22. The computing device of claim 9, wherein the base point cloud and the new point cloud comprise survey data of a terrain area.

23. A non-transitory processor readable medium having stored thereon processor-readable instructions configured to cause a processor of a computing device to perform operations comprising: receiving a base point cloud; receiving a new point cloud; determining any overlap between the base point cloud and the new point cloud, wherein determining any overlap between the base point cloud and the new point cloud comprises: generating a raster map of the new point cloud; and determining base points in the base point cloud overlapped by the raster map; updating overlapped base points in the base point cloud, wherein updating overlapped base points in the base point cloud comprises updating overlapped base points in the base point cloud based on the raster map; and outputting a single point cloud based at least in part on the updated base point cloud and the new point cloud.

24. The non-transitory processor readable medium of claim 23, wherein the stored process-readable instructions are configured to cause a processor of a computing device to perform operations such that generating the raster map of the new point cloud comprises identifying pixels of the raster map containing at least one point of the point cloud as occupied pixels of the raster map.

25. The non-transitory processor readable medium of claim 23, wherein the stored process-readable instructions are configured to cause a processor of a computing device to perform operations such that generating the raster map of the new point cloud comprises triangulating the new point cloud and identifying pixels of the raster map touching at least one triangle of the triangulated new point cloud as occupied pixels of the raster map.

26. The non-transitory processor readable medium of claim 23, wherein the stored process-readable instructions are configured to cause a processor of a computing device to perform operations such that the base point cloud and the new point cloud are 2.5D point clouds.

27. The non-transitory processor readable medium of claim 23, wherein the stored process-readable instructions are configured to cause a processor of a computing device to perform operations such that outputting the single point cloud based at least in part on the updated base point cloud and the new point cloud comprises rendering data of the single point cloud on a display as a 2.5D model.

\* \* \* \* \*